United States Patent
Varunjikar et al.

(10) Patent No.: US 12,139,137 B2
(45) Date of Patent: Nov. 12, 2024

(54) SIMULATOR FOR EVALUATING VEHICULAR LANE CENTERING SYSTEM

(71) Applicant: Magna Electronics Inc., Auburn Hills, MI (US)

(72) Inventors: Tejas M. Varunjikar, Troy, MI (US); Arpit Awathe, Auburn Hills, MI (US); Chao Chen, Rochester Hills, MI (US); Pushpendra Kushwaha, Uttar pradesh (IN)

(73) Assignee: Magna Electronics Inc., Auburn Hills, MI (US)

( * ) Notice: Subject to any disclaimer, the term of this patent is extended or adjusted under 35 U.S.C. 154(b) by 368 days.

(21) Appl. No.: 17/452,419

(22) Filed: Oct. 27, 2021

(65) Prior Publication Data

US 2022/0135030 A1  May 5, 2022

Related U.S. Application Data

(60) Provisional application No. 63/200,164, filed on Feb. 18, 2021, provisional application No. 63/198,599, filed on Oct. 29, 2020.

(51) Int. Cl.
*B60W 30/12* (2020.01)

(52) U.S. Cl.
CPC ....... *B60W 30/12* (2013.01); *B60W 2420/403* (2013.01); *B60W 2510/0638* (2013.01); *B60W 2552/30* (2020.02); *B60W 2552/53* (2020.02); *B60W 2554/4045* (2020.02)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |

(Continued)

FOREIGN PATENT DOCUMENTS

KR    20150057537 A   *   5/2015

OTHER PUBLICATIONS

Ahn, Machine translation of KR20150057537A, 2015, espacenet.com (Year: 2015).*

*Primary Examiner* — David P. Merlino
(74) *Attorney, Agent, or Firm* — HONIGMAN LLP

(57) ABSTRACT

A method includes providing a simulation environment that simulates a vehicle. The method includes providing the vehicular lane centering algorithm to the simulation environment, generating a base scenario for the vehicular lane centering algorithm for use by the simulated vehicle, and extracting, from the simulation environment, traffic lane information. The method also includes measuring performance of the vehicular lane centering algorithm during the base scenario using the extracted traffic lane information and generating a plurality of modified scenarios derived from the base scenario. Each modified scenario of the plurality of modified scenarios adjusts at least one parameter of the base scenario. The method also includes measuring performance of the vehicular lane centering algorithm during the plurality of modified scenarios using the extracted traffic lane information.

18 Claims, 23 Drawing Sheets

(56) References Cited

U.S. PATENT DOCUMENTS

| | | |
|---|---|---|
| 7,720,580 B2 | 5/2010 | Higgins-Luthman |
| 7,855,755 B2 | 12/2010 | Weller et al. |
| 10,071,687 B2 | 9/2018 | Ihlenburg et al. |
| 10,099,614 B2 | 10/2018 | Diessner |
| 10,841,571 B2 | 11/2020 | Sigle |
| 10,870,400 B2 | 12/2020 | Thomas et al. |
| 11,403,857 B2* | 8/2022 | Sathyanarayana ........ G06T 7/11 |
| 11,609,304 B2 | 3/2023 | Kunkel |
| 11,620,522 B2 | 4/2023 | Potnis |
| 11,643,104 B2 | 5/2023 | Ustunel |
| 11,745,749 B2 | 9/2023 | Potnis |
| 2016/0210775 A1* | 7/2016 | Alaniz .................... G06F 30/15 |
| 2019/0138432 A1 | 5/2019 | Nagaraj et al. |
| 2019/0146492 A1* | 5/2019 | Phillips ................ G05B 13/041 701/23 |
| 2020/0249684 A1* | 8/2020 | Onofrio ............... G05D 1/0223 |
| 2020/0339109 A1* | 10/2020 | Hong .................... G01M 17/06 |
| 2021/0255984 A1 | 8/2021 | Khatri |
| 2022/0009522 A1* | 1/2022 | Zhang ................ B62D 15/025 |
| 2022/0048566 A1 | 2/2022 | Prasad Challa et al. |
| 2022/0176960 A1 | 6/2022 | Awathe et al. |

* cited by examiner

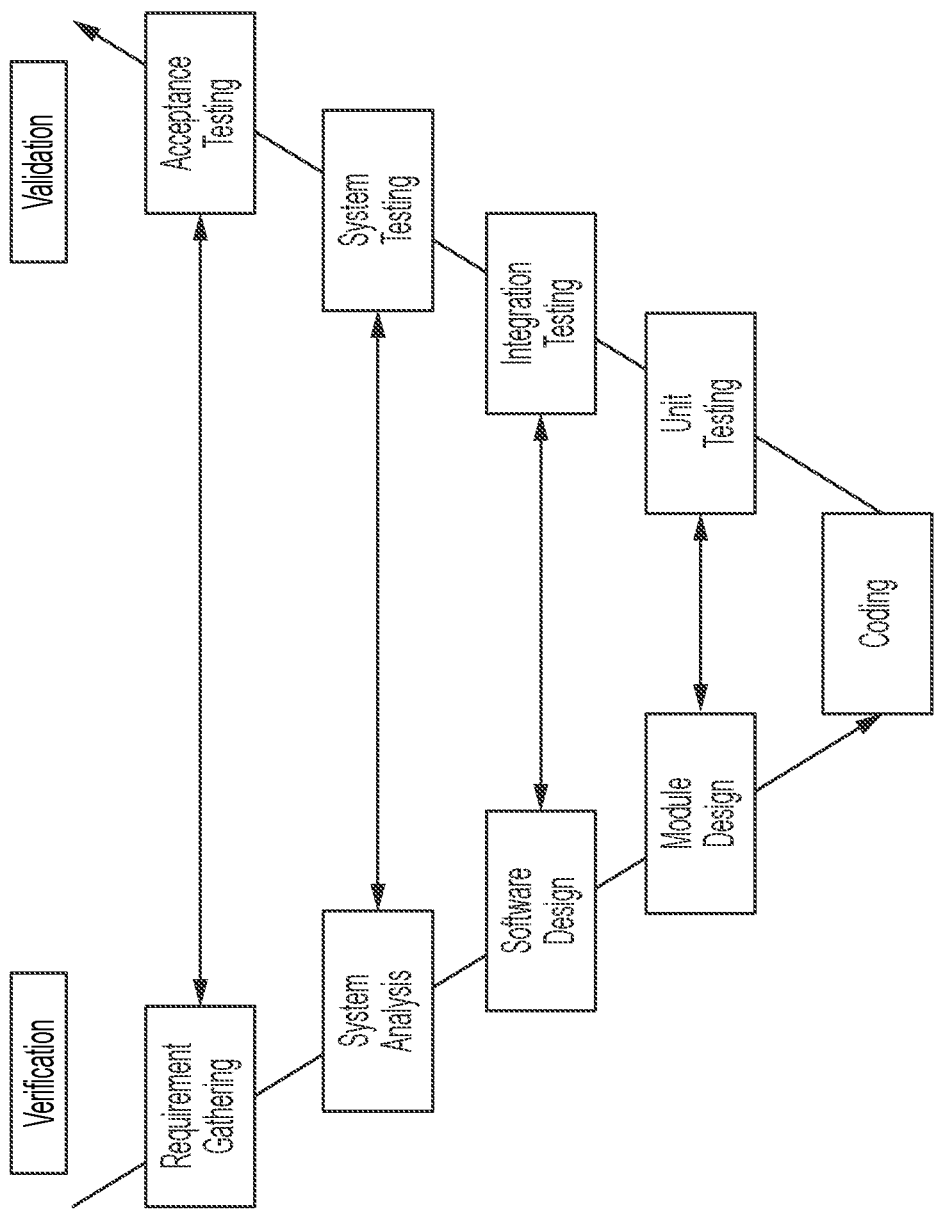

$d(0) = d_v(0)$ $\dot{d}(0) = \dot{d}_v(0)$ $\ddot{d}(0) = \ddot{d}_v(0)$ $d(T_H) = d_c(T_H)$ $\dot{d}(T_H) = \dot{d}_c(T_H)$ $\ddot{d}(T_H) = \ddot{d}_c(T_H)$

Boundary Conditions

FIG. 6B

| Parameter | Base Value | Variation Min | Variation Max |
|---|---|---|---|
| Wheelbase (m) | 2.916 | 2.625 (-10%) | 3.207 (+10%) |
| Mass (kg) | 2947.96 | 2653.96 (-10%) | 3241.96 (+10%) |
| Tire Stiffness | TBD | TBD | TBD |

FIG. 10A

| Base Simulation | | |
|---|---|---|
| Index | Variation | Details |
| 1 | Vehicle Type | Large SUV |
| 2 | Road Banking | 0 Deg |
| 3 | Vehicle Speed | 60 Kph |
|  |  | 120 Kph |
| 4 | Radii of curved Road | 278 m($R_0$), 140 m ($R_1$) for 60 kph |
|  |  | 1111 m($R_0$), 560 m ($R_1$) for 120 kph |

FIG. 10B

| S.No | Variation | Vehicle front axle load | Vehicle rear axle load | Road section | Road Bank | Steering Bias |
|---|---|---|---|---|---|---|
| 1 | Base | Nominal | Nominal | Straight | 0 deg | 0 deg |
| 2 | Vehicle Loading | 10% increase | " | Curved ($R_1$ m) | " | " |
| 3 | Vehicle Loading | " | 10% increase | Curved ($R_1$ m) | " | " |
| 4 | Radius of curvature | " | " | Curved ($R_0$ m) | " | " |
| 5 | Radius of curvature | " | " | Curved ($R_1$ m) | " | " |
| 6 | Bank Angle | " | " | Straight | 3 deg | " |
| 7 | Steering Bias | " | " | Straight | " | 2 deg |

FIG. 11B

| Host Speed | MeanStRoad | StdStRoad | MeanCurvRoad | StdCurvRoad |
|---|---|---|---|---|
| 60 kmph | -0.0012 | 0.0033 | 0.0130 | 0.0046 |
| 120 kmph | 0.0022 | 0.0012 | 0.1248 | 0.0257 |

Table: KPI's calculated during simulation

FIG. 12

| Host Speed | MeanStRoad | StdStRoad | MeanCurvRoad | StdCurvRoad |
|---|---|---|---|---|
| 60 kmph | -0.0010 | 0.0029 | 0.0660 | 0.0045 |
| 120 kmph | 0.0020 | 0.0010 | 0.1357 | 0.0276 |

Table: KPI's calculated when Host Vehicle's Mass and Wheelbase were increased by 10 percent

FIG. 13

| Host Speed | MeanStRoad | StdStRoad | MeanCurvRoad | StdCurvRoad |
|---|---|---|---|---|
| 60 kmph | -0.0015 | 0.0028 | -0.0415 | 0.0043 |
| 120 kmph | 0.0025 | 0.0014 | 0.1090 | 0.0227 |

Table: KPI's calculated when Host Vehicle's Mass and Wheelbase were decreased by 10 percent

FIG. 14

| Host Speed | MeanStRoad | StdStRoad | MeanCurvRoad | StdCurvRoad |
|---|---|---|---|---|
| 60 kmph | -0.0880 | 0.0038 | -0.0817 | 0.0082 |
| 120 kmph | -0.2427 | 0.0111 | -0.1359 | 0.0366 |

Table: KPI's calculated when Road Banking was changed to -3 degree

FIG. 15

| Host Speed | MeanStRoad | StdStRoad | MeanCurvRoad | StdCurvRoad |
|---|---|---|---|---|
| 60 kmph | -0.0014 | 0.0036 | 0.0555 | 0.0098 |
| 120 kmph | 0.0005 | 0.0005 | 0.1104 | 0.0239 |

Table: KPI's calculated with feedback

FIG. 16

SIMULATOR FOR EVALUATING VEHICULAR LANE CENTERING SYSTEM

CROSS REFERENCE TO RELATED APPLICATION

The present application claims priority of U.S. provisional application Ser. No. 63/200,164, filed Feb. 18, 2021, and U.S. provisional application Ser. No. 63/198,599, filed Oct. 29, 2020, which are hereby incorporated herein by reference in their entireties.

FIELD OF THE INVENTION

Implementations here relate generally to a vehicular vision system for a vehicle and, more particularly, to a vehicular vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a method for testing a driving assistance system or vision system or imaging system for a vehicle that utilizes one or more cameras (preferably one or more CMOS cameras) to capture image data representative of images exterior of the vehicle. The method includes providing a simulation environment that simulates a vehicle. The method also includes providing a vehicular lane centering algorithm to the simulation environment. The method also includes generating a base scenario for the vehicular lane centering algorithm for use by the simulated vehicle and extracting, from the simulation environment, traffic lane information. The method also includes measuring performance of the vehicular lane centering algorithm during the base scenario using the extracted traffic lane information and generating a plurality of modified scenarios based on the base scenario. Each modified scenario adjusts at least one parameter of the base scenario. The method includes measuring performance of the vehicular lane centering algorithm during each of the plurality of modified scenarios using the extracted traffic lane information.

These and other objects, advantages, purposes and features of the present invention will become apparent upon review of the following specification in conjunction with the drawings.

BRIEF DESCRIPTION OF THE DRAWINGS

FIGS. 2A and 2B are block diagrams of verification and validation integration with virtual simulations;

FIG. 6B is a schematic view of exemplary boundary conditions for the generated trajectory of FIG. 6A;

FIGS. 10A and 10B are tables of base and variation values for vehicle parameters for a simulation;

FIG. 11B is a table of vehicle variation parameters;

FIGS. 12-16 are tables of calculated key performance indexes from simulations with different parameters;

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
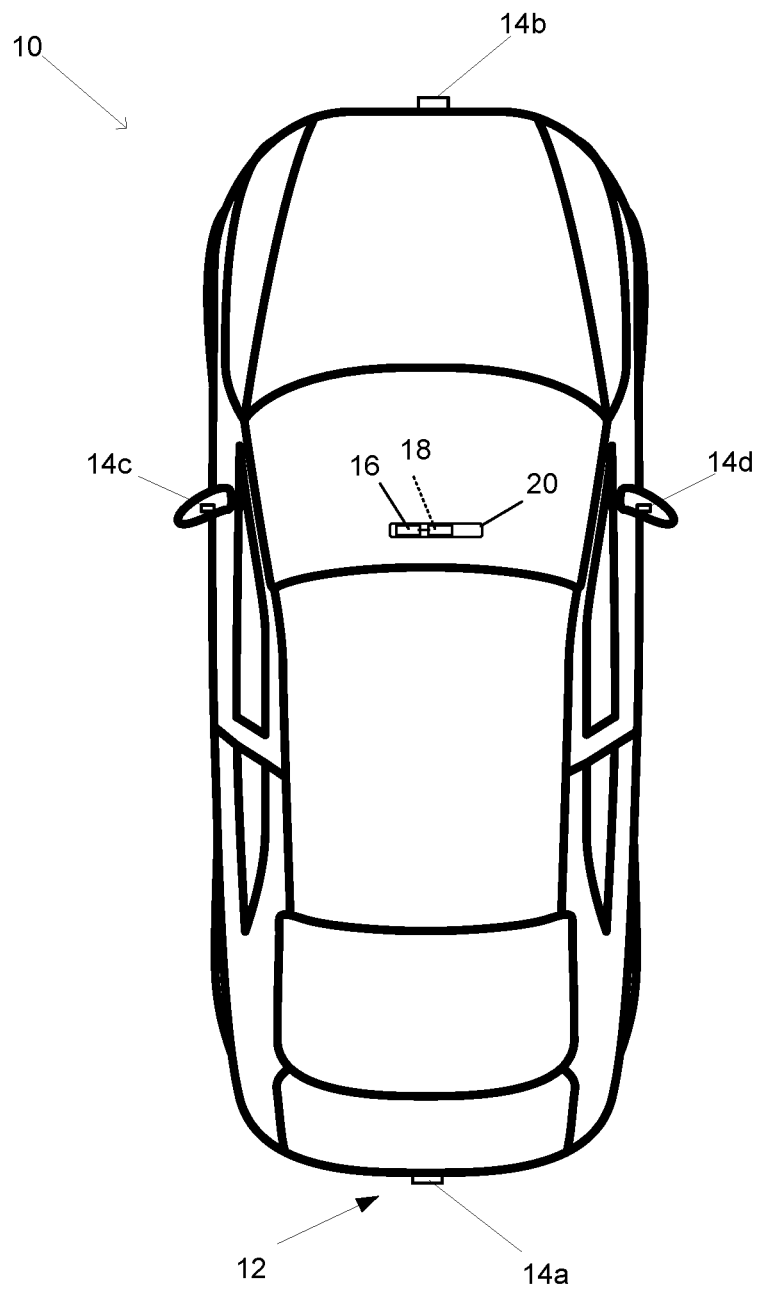
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Advances in automotive technology continue to deliver safety and driving comfort benefits to the society. Automated Driving Assistance System (ADAS) technology is at the forefront of this evolution. Today, various vehicle models on the road have features like lane keeping assist, lane centering, automated emergency braking, adaptive cruise control, traffic jam assist, etc. During early development, such feature algorithms often assume ideal environmental and vehicle conditions during performance evaluation. Implementations herein include a simulation platform for evaluating robustness of the lane centering ADAS feature in presence of various factor variations. The implementations include an end-to-end feature, i.e., from camera sensor output to steering actuation. The use of closed-loop simulation tools is well recognized in the automotive industry for early requirements validation as well as robustness study. However, it has been traditionally used mainly for vehicle actuator controls rather than ADAS features. Variations such as road geometry, vehicle platform variations, sensor noises, etc. are considered. The performance metrics of the lane centering feature are presented for the base case as well as in the presence of these variations to highlight real life challenges encountered while developing such feature algorithms. Furthermore, implementations herein reduce such variation where necessary. The implementations provide help in understanding effects of variation in various relevant factors and how to use simulation tools to understand and tackle such challenges.

The advances in automotive technology continue to deliver safety and driving comfort benefits to the society. The ADAS technology is at the forefront of this evolution. A number of today's new motor vehicles have technology that helps drivers avoid drifting into adjacent lanes or making unsafe lane changes, or that warns drivers of other vehicles behind them when they are backing up, or that brakes automatically if a vehicle ahead of them stops or slows suddenly, among other things. These and other safety technologies use a combination of hardware (sensors, cameras, and radar) and software to help vehicles identify certain safety risks so they can warn the driver to act to avoid a crash. Such safety features enhance safety of a vehicle. In addition to that, there are several features that make every day driving more comfortable and reduce driver fatigue. These comfort features include Adaptive Cruise Control (ACC), Lane Keeping Assist, Lane Centering Assist, Automated Lane Change, etc.

There are different control strategies available in literature used for lane centering. Perhaps the simplest strategy is the pure pursuit method which assumes circular motion of vehicles at each point to meet a desired path at a chosen look-ahead point. Some other methods use either a kinematic or dynamic bicycle model theory to design a feedforward/feedback control based on error states such as lateral position error, heading error, etc. Most of such methods directly use intended path information to get some form of error states to produce a desired steer angle in the end. In today's vehicles, there could be multiple comfort and safety lateral ADAS features that use lateral control. For example, an Autonomous Emergency Steering (AES) feature would need to produce a desired trajectory within system limits to avoid collision. On other hand, features such as lane centering may also use this intermediate trajectory generation based on a reference path (such as road center) to execute lane centering functionality. For instance, some techniques consider a quintic polynomial with certain constraints to generate a desired vehicle trajectory to perform lateral control. In fact, generating an optimal vehicle trajectory to follow is often a complex problem. There are other methods to calculate sub-optimal trajectories. However, many of these methods consume significant computation power which may not be suitable depending on hardware used for deployment. Implementations herein assume a high-order trajectory generation approach with boundary constraints to determine effect of external variations on overall performance. As discussed above, several control strategies exist for lane centering with a pure pursuit method generally being the simplest. Some other methods use either a kinematic or dynamic bicycle model theory for control design. Yet other methods use road centerline details to obtain error states and produce a control command. Most of the literature available assumes ideal or kinematic vehicle model and road conditions to evaluate various methods. A focus of techniques herein includes highlighting aspects of lateral control that can help make overall systems robust to external variations.

Figure 2B:
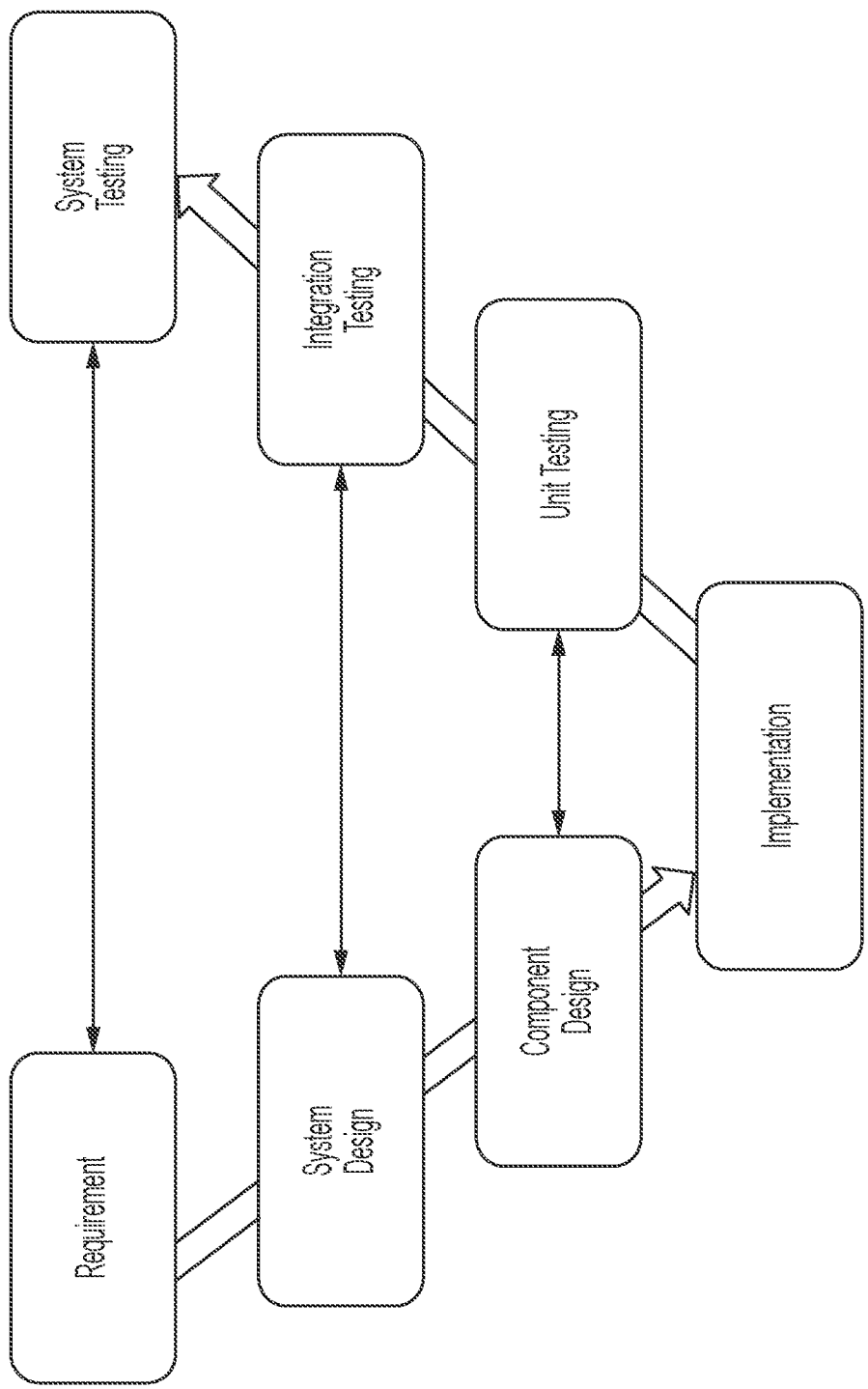

Referring now to FIGS. 2A and 2B, simulation tools can help to evaluate algorithm performance during the left side of the V-cycle. Tools such as CarMaker and MATLAB may be utilized to evaluate ADAS features to make appropriate algorithm design decisions. Simulation testing can cover a wide range of driving/road scenarios and reduce tuning/development efforts (e.g., effects of variations such as road geometry, vehicle loading, steering bias, vehicle platform, etc. may be considered). These tools can also help to understand in-vehicle performance or behavior that can affect early design of ADAS features.

Figure 3:
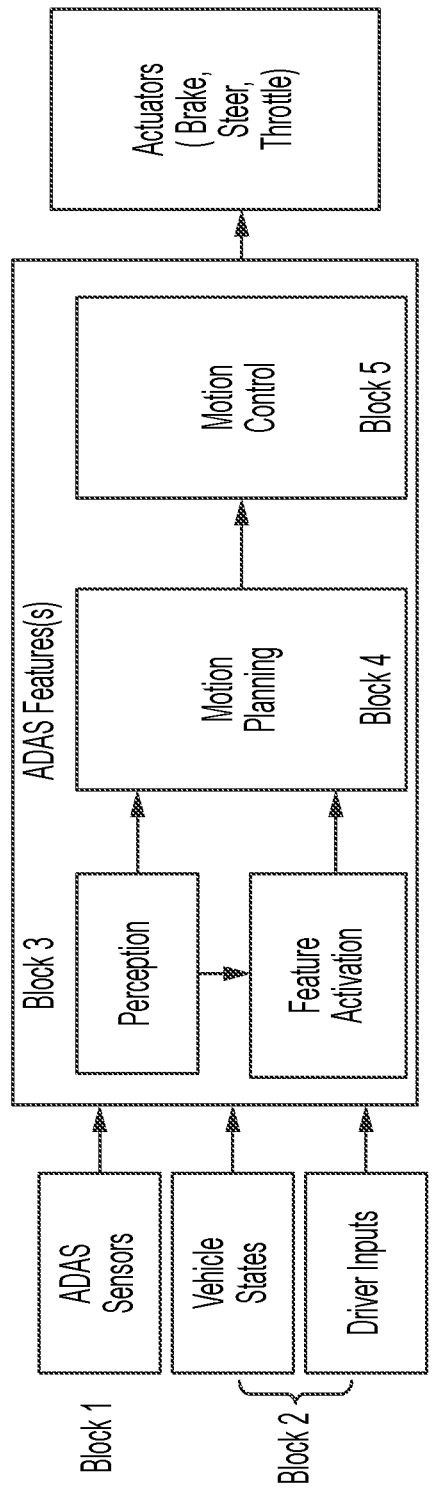
FIG. 3 is a block diagram of an exemplary advanced driver assistance system architecture.

Referring now to FIG. 3, an exemplary block diagram of an ADAS architecture includes three blocks. The first block includes one or more sensors such as a forward collision mitigation (FCM) camera, radars, etc. At block 2, vehicle states and driver inputs (e.g., yaw rate, human-machine interface (HMI) inputs, etc.) are received. Block 3 provides necessary environmental information (e.g., lane marks, object lists, etc.). Block 4 plans longitudinal and/or lateral motion of the vehicle and block 5 generates the necessary actuation commands to control the vehicle motion.

Figure 4:
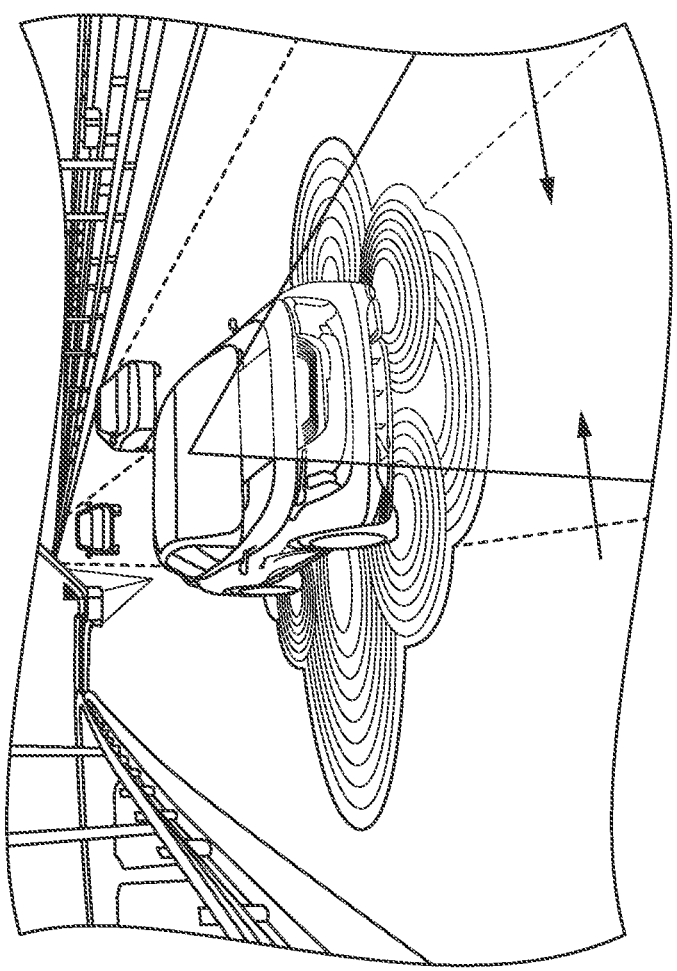
FIG. 4 is a perspective view of a vehicle equipped with a lane centering system.

Referring now to FIG. 4, lane centering is a comfort feature that enables the vehicle to maintain the lane center through automatic steering in response to lane path changes (e.g., straight and curving road portions). Lane centering reduces a driver's steering effort by actively guiding the vehicle to the center of the traffic lane. This is especially helpful for long distance travel on highways and local roads. A typical lane centering system uses a forward looking camera to continuously monitor the lane markers of the current (and potentially adjacent) traffic lane. Using the lane markers detected in the image data captured by the camera, the lane centering system calculates a steering angle/torque command to maintain the vehicle at or near the center of the lane. This feature helps reduce driver fatigue by making driving more comfortable.

Figure 5:
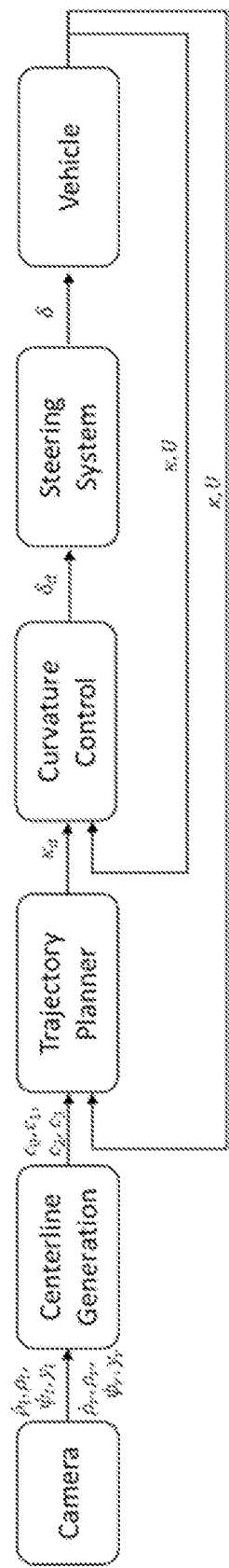
FIG. 5 is a block diagram of a lane centering control architecture.

Referring now to FIG. 5, the block diagram shows building blocks of the lane centering feature and various components, systems, and architecture of the feature. As discussed in more detail below, the camera sends information including lane and object information. The centerline generation then uses the information from the camera to express the centerline of the host vehicle lane as a polynomial equation of the third order. The trajectory planner produces a dynamic trajectory using current and expected vehicle motion as boundary conditions.

The system includes a camera. For example, front camera modules (FCMs) are very common in today's passenger vehicles equipped with ADAS features. These forward viewing camera modules are usually mounted on the front windshield and capture images of front views from the vehicle. Such modules output a wide array of useful information including lane-mark information. Specifically, lane-mark position ($\gamma$), heading ($\psi$), curvature ($\rho$), and curvature derivative ($\dot{\rho}$) are outputted for left and right lane-marks.

The Centerline Generation module uses the information captured and provided by the camera (e.g., the FCM) to express centerline of the host vehicle lane as a polynomial equation of third order as shown below:

$$y_c(x) = c_3 x^3 + c_2 x^2 + c_1 x + c_0 \qquad (1)$$

In Equation (1), $y_c(x)$ indicates lateral position of a centerline point at longitudinal distance x in host vehicle's local coordinate system. In reality, the quality or confidence of each lane-mark received from the camera may not match all the time. For example, the lane-mark on one side of the traffic lane may be poorly visible and lane processing needs to be performed to manage or compensate for this. Within the scope of the techniques herein, such effects may not be considered.

Figure 6A:
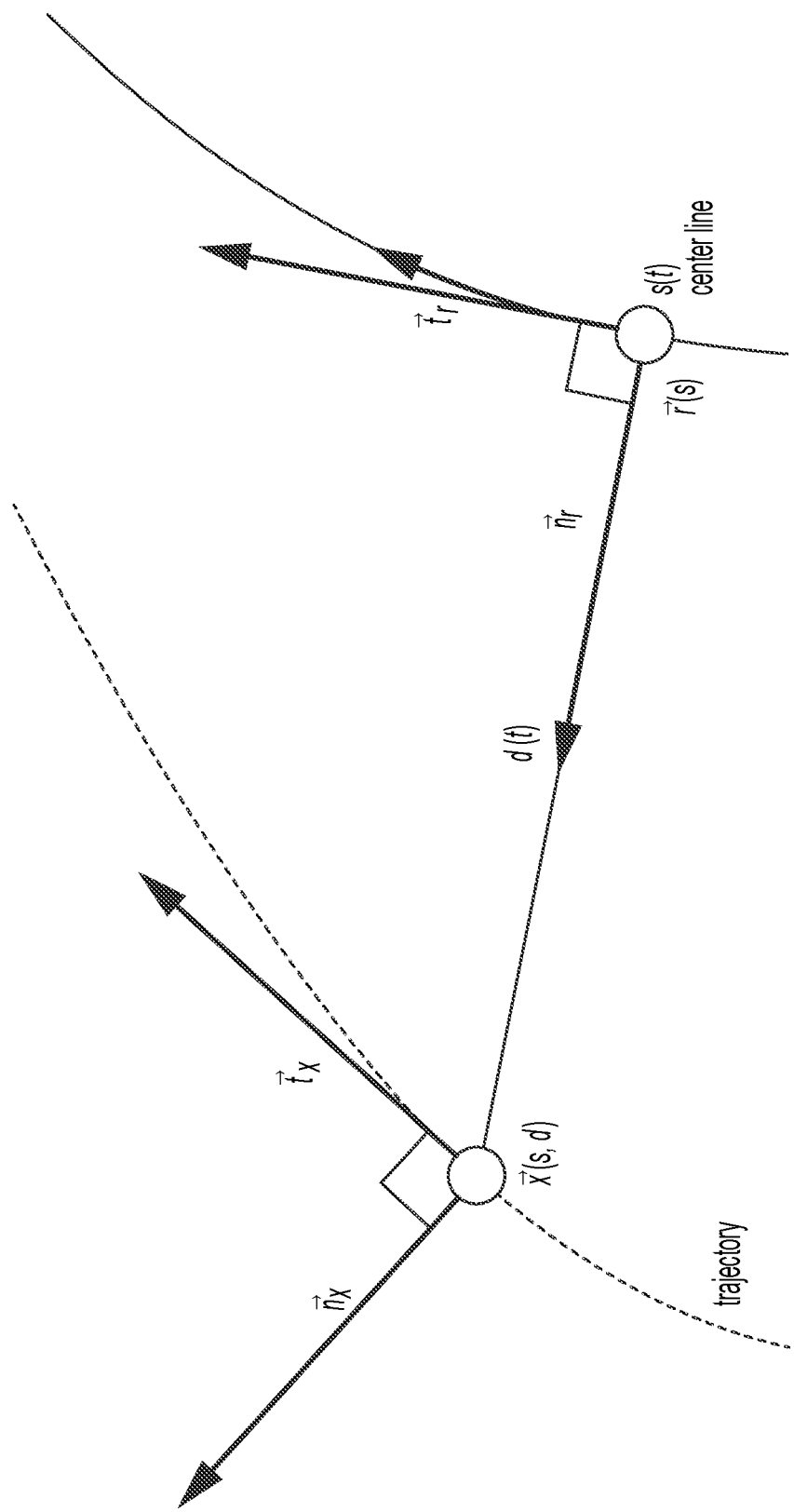
FIG. 6A is a schematic view of an example generated trajectory in Frenet Frame.

Referring now to FIGS. 6A and 6B, the trajectory planner block produces a dynamic, desired curvature ($\kappa_d$) value for vehicle to follow. The centerline of the host lane is fixed in a global coordinate system. However, the system must plan a trajectory in its local coordinates every time. Such a trajectory, if perfectly followed, would take the equipped vehicle to the centerline of the traffic lane. Furthermore, reaching the centerline with correct heading and curvature is also important to stay on the course of that centerline path. There are various ways to generate such a trajectory (y=y(x)). Here, a quintic polynomial based trajectory generation (e.g., in Frenet coordinates) is included. To perform the trajectory curvature calculation, a certain look-ahead is used to get the target curvature using the trajectory. The look-ahead is chosen such that it compensates for the system delay between the desired curvature (kd) and the actual host vehicle curvature (k) achieved. A trajectory is generated for a horizon time of $T_H$. It is assumed that the vehicle speed is constant. To get coefficients of such polynomial, following boundary conditions may be used (as also shown in FIG. 6B):

$y(0) = y_v(0)$
$\dot{y}(0) = \dot{y}_v(0)$
$\ddot{y}(0) = \ddot{y}_v(0)$
$y(T_H) = y_c(T_H)$
$\dot{y}(T_H) = \dot{y}_c(T_H)$
$\ddot{y}(T_H) = \ddot{y}_c(T_H)$ Here, the derivatives are taken with respect to longitudinal distance x in the local vehicle coordinate system.

Once a trajectory is obtained to go from the current vehicle pose to the target point at horizon time $T_H$, the next step is to obtain desired vehicle curvature. This is done by setting a look-ahead time, $T_{LH}$ ($<T_H$) and picking trajectory curvature at that point. Due to system dynamics, there is some lag between desired curvature, $\kappa_d$, and actual host vehicle curvature ($\kappa$). Hence, a look-ahead time close to this lag time is chosen. Note that an alternative option in this case is to use lateral position and heading errors along the trajectory to calculate a curvature command. However, the planning is already being done iteratively, and hence, the above methodology was used.

A curvature control module uses vehicle wheelbase and an understeer gradient value ($K_{us}$) to convert the desired curvature, $\kappa_d$, to a steer angle command, $\delta_d$ at given vehicle speed, u, as shown in Equation (2).

$$\delta_d = (L + K_{us} \cdot U^2) \kappa_d \qquad (2)$$

That is, the curvature control generates a steer angle command $\delta_d$ at a given vehicle speed U and using the vehicle wheelbase, understeer gradient, and desired curvature. Later, the variation analysis considers the feedback path for Curvature Control in addition to the feedforward term mentioned above. The feedback term consists of proportional-integral-derivative (PID) control applied to the curvature error between desired and actual curvature.

The steering system, such as the electric power steering (EPS) system generally accepts either angle or motor torque as input to help steer the vehicle. In this case, the steer angle command obtained from curvature control module is used internally by the EPS to get to the equivalent steer angle, $\delta$. The vehicle's lateral motion is ultimately controlled by this angle. Once the vehicle sets in motion, the vehicle yaw rate starts changing. The vehicle yaw rate and vehicle speed are used to get a host vehicle curvature (=YawRate/U).

Figure 7:
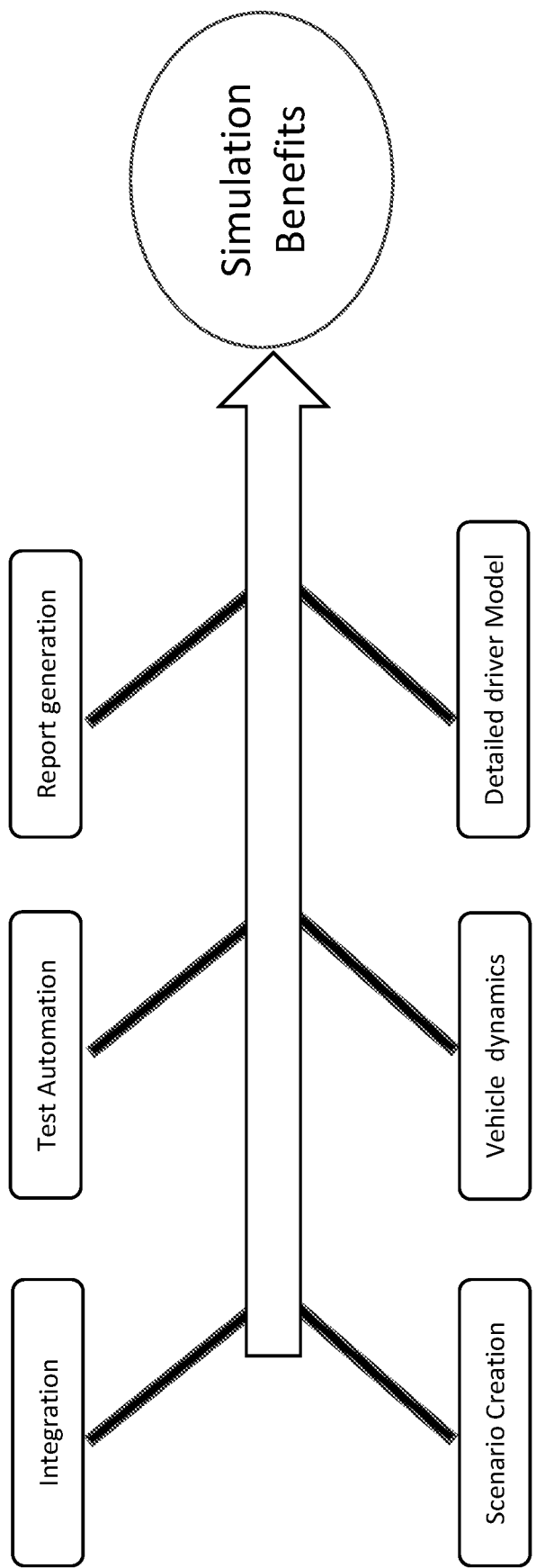
FIG. 7 is a schematic view of simulation integration benefits.

Referring now to FIG. 7, a closed loop simulation (i.e., the input is adjusted as a function of the output) for ADAS has various advantages. For example, the closed loop simulation provides integration, test automation, report generation, and scenario creation. The closed loop simulation can ensure vehicle dynamics and detailed driver models.

Figure 8:
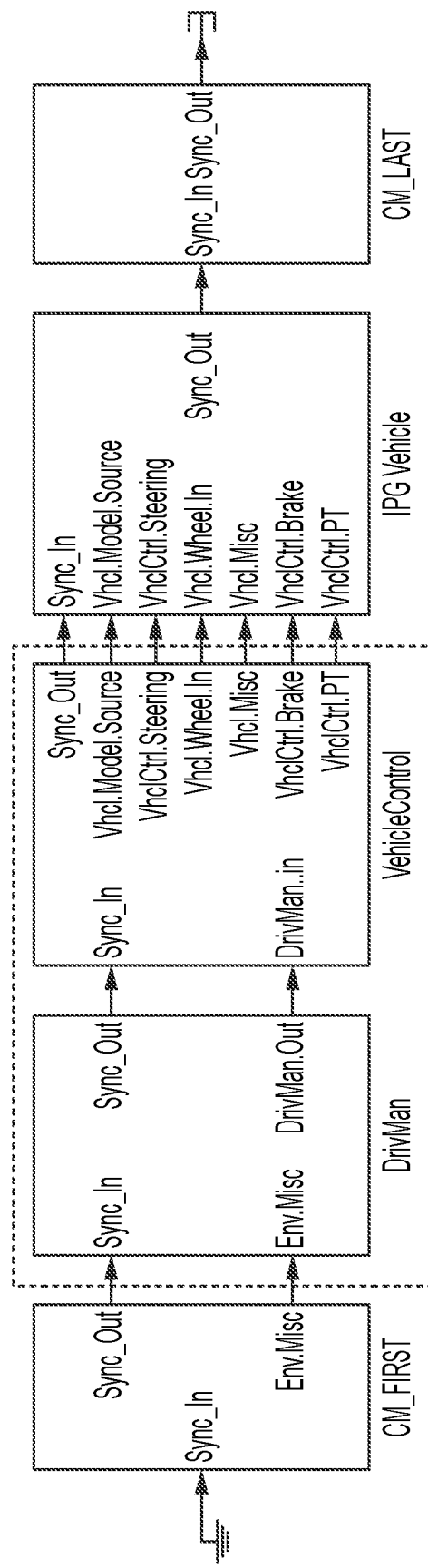
FIG. 8 is a block diagram of a simulation environment of the vision system of FIG. 1.

Referring now to FIG. 8, CarMaker is a popular software platform being used in the automotive industry for virtual simulations as the software very accurately describes vehicle dynamics of vehicles. However, with the new development in the field of automated driving systems, the features need to be tested in a wide range of scenarios including some corner cases, where safety, performance, and comfort parameters (among many other things) are evaluated. Some of these corner cases are difficult to recreate in real world and further may incur a significant cost factor. Additionally, repeatability is often an issue when attempting to test such corner cases. However, such ADAS/AD scenarios can be accurately created in CarMaker and to tune and test the algorithm. Simulation testing saves time and is a cost-effective method when compared to physical testing. One important aspect of CarMaker simulation is test automation and report generation which helps in analysis.

To aid in integration, the CarMaker software comes with its own detailed vehicle and a driver model. The driver model can perform various kind maneuvers including the ADAS/AD maneuvers. A lane centering feature sends an angle command to the CarMaker vehicle. However, since the aim is to evaluate custom control algorithms, techniques herein bypass the CarMaker lateral control and instead use custom control algorithms described in more detail below. The block diagram (FIG. 8) shows how bypassing various controls in CarMaker may be accomplished.

The vehicle states (e.g., vehicle speed, yaw rate, etc.) needed for simulation models may be extracted from a number of sensors including inertial sensors. Also, the lane-mark information may be extracted from the camera and line sensor module present in CarMaker. In Carmaker, the sensors are aligned in the exact same position and orientation as the test vehicle.

Figure 9:
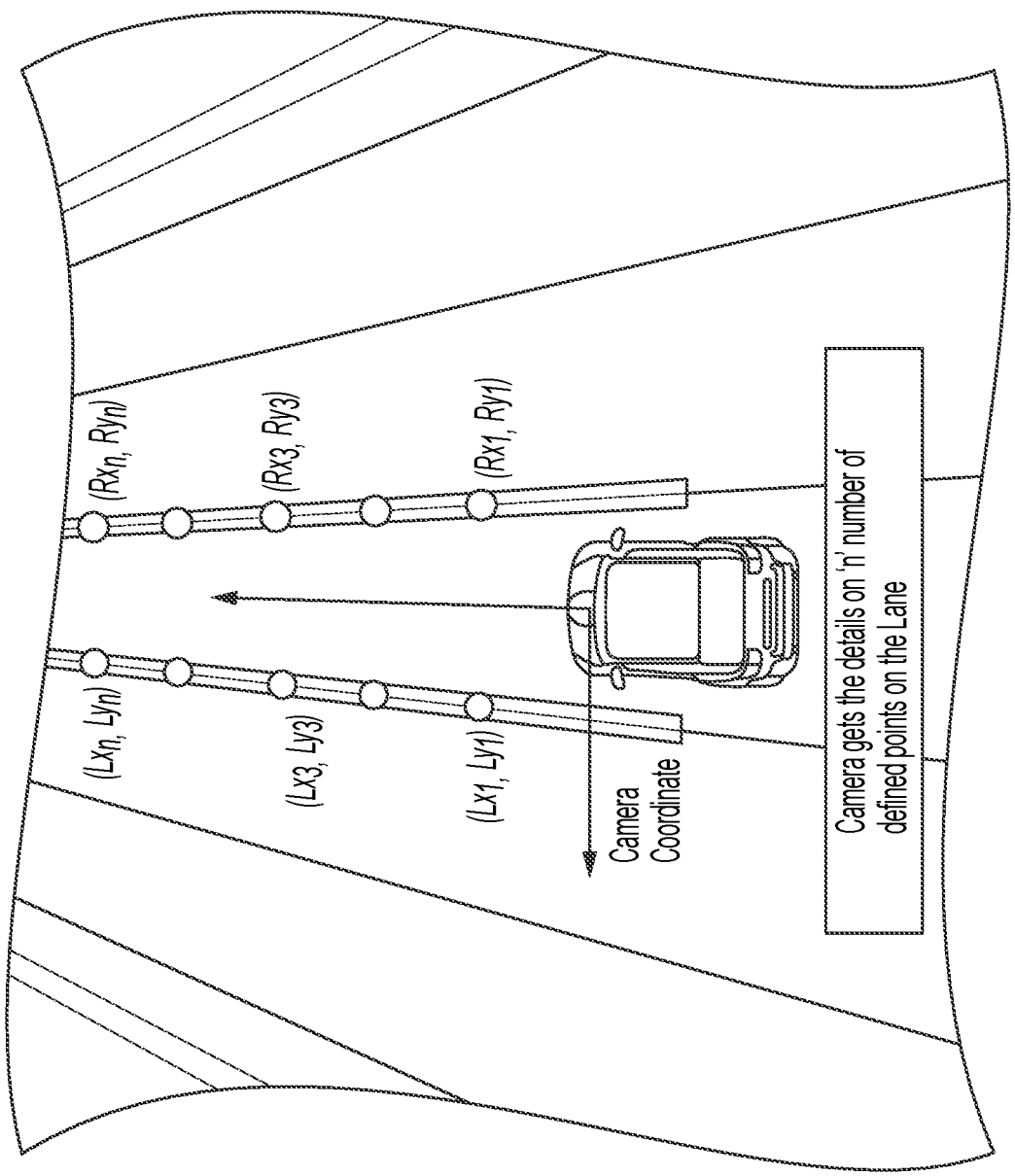
FIG. 9 is a perspective view of a lane centering control of a vehicle extracting lane information.

Referring now to FIG. 9, to extract lane information, all ADAS/AD software takes input from various sensors to get the information of the outside environment. This information can come from single or multiple sensors. For example, the lane information may generally be derived from image data captured by a camera, which has been present in the industry from a long time. The camera sends the lane information in the form of a polynomial equation. The algorithm described herein takes these lane polynomials and uses them for the controls. However, in CarMaker, getting the lane information is not straightforward. A line sensor with some changes in the CarMaker setup may be used. This sensor outputs several points from left and/or right lane-marks. These points are used and fitted to get polynomial equation of the lanes.

Once the details of these 'n' points are obtained, the equations may be fitted to get a polynomial equation of order 'p' in the simulation setup. The coefficients of the polynomial equation are used to calculate inputs for the centerline calculation module.

Equation (3) is an example of lane polynomial format for the first and last (n) point coming from the line sensor.

$$Ly_1 = aL_{x_1}^P + bL_{x_1}^{P-1} + cL_{x_1}^{P-2} + \ldots$$

$$Ly_n = aL_{x_n}^P + bL_{x_n}^{P-1} + cL_{x_n}^{P-2} + \ldots \qquad (3)$$

CarMaker sends lane information by sending details of several discrete points from the lane-marks (e.g., left and right lane-marks). These points are fitted to get a polynomial equation of the lanes as shown in Equation (3).

The idea is to develop a robust algorithm which can handle all the variations (i.e., variation factors should be considered). Thus, while running the test cases it is important to consider all the variations which can be found in the real world. These variations are mentioned below.

The developed algorithm should be able to work with different vehicles (i.e., vehicle platform variation). Hence, some variation in vehicle's parameters such as wheelbase, weight, tire stiffness, etc. may be considered. Because a vehicle can carry multiple passengers or different loads, additional weight (e.g., 10% of vehicle weight) may be simulated on the front and/or rear axle.

The road geometry of road sections considered may include straight and curved patches. The radius of the curved road is calculated using, for example, Radius=$U^2/a_y$, where $a_y=1$ m/s² is considered. The roads in, for example, the United States, are usually designed to not exceed this value at the posted speed limit. Another important factor to consider here is the road bank angle or super elevation. The bank angle is very common even for straight roads as well as curved roads. Some banking angle is added to flush/drain the rainwater. Thus, there will generally be some non-zero steering rack force required to go straight.

There are several sensors that may be used for this feature to get vehicles state information as well as camera-based information. Different sensors have their own specifications. One important aspect of the sensors is their delay characteristic (e.g., sensor delays) which can change system performance. Thus, the algorithm may account for added delay in the simulation to accurately represent the sensor and check its effect on the algorithm performance.

Any other variations may also be accounted for. For example, tire misalignment or other steering issues and bias of hand wheel degrees (e.g., 2 degrees) may be simulated for some road geometries (e.g., straight roads). Different lateral acceleration values may be used (e.g., 1 m/s, 2 m/s, etc.).

Referring now to FIG. 10A, while designing the control algorithms, engineers usually start with the assumption of a vehicle system with known properties such as wheelbase, mass, inertia, tire cornering stiffness, etc., such as the parameters shown in the table of FIG. 10A.

Referring now to FIG. 10B, a table showing the base setup for simulation results is illustrated. In this example, a closed loop simulation environment is created for the lane centering feature. This base setup is created using a "Model in Loop" technique in a tool such as Simulink. Thus, together with CarMaker and Simulink, a closed Model in Loop environment is created. The lane centering feature, developed in Simulink, may be tested on different scenarios.

Here, the base scenario is created using CarMaker. Exemplary details include:
Simulation vehicle used: Large SUV
Number of lanes=3
Road Banking=0 degree
Host Vehicle Speed=60 kmph, 120 kmph
Radius of Curved Road portion=278 m ($R_0$), 140 m ($R_1$) for 60 kph and 1111 m ($R_0$), 560 m ($R_1$) for 120 kph.

Figure 11A:
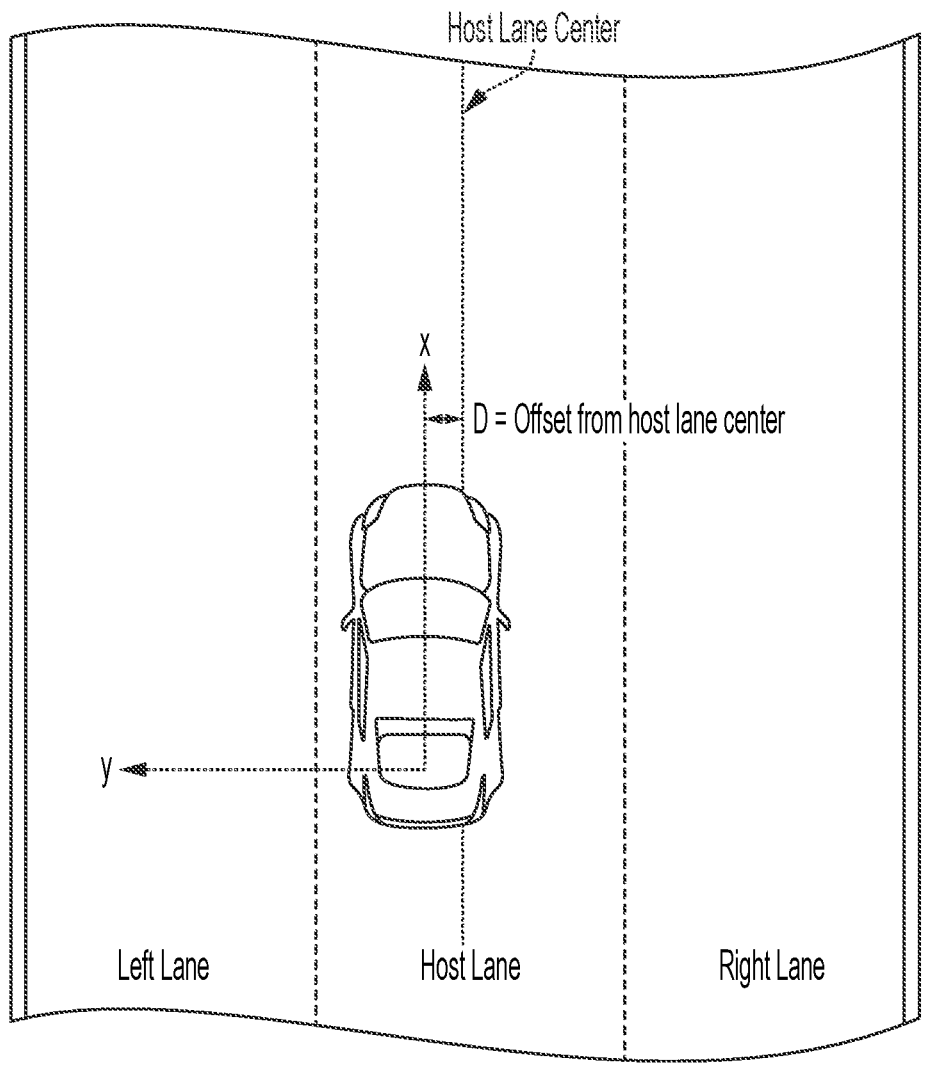
FIG. 11A is a plan view of a vehicle determining offset from a lane center.

Referring now to FIGS. 11A and 11B, the following describes exemplary simulation steps. First, the host or equipped vehicle starts at a certain speed and travels on a straight road for 10 seconds. Next, the host vehicle enters a curve and stays in the curve for next 10 seconds. Next, the host vehicle exits the curve and then enters a straight road again for 2 seconds. To measure the performance of the lane centering feature, the technique includes calculating the offset of the host vehicle rear axle from the host lane center. This offset is referred to as "D". The value of D may be calculated by processing the lane boundary outputs from the front camera. That is, performance is evaluated based on the offset of the host vehicle rear axle from the host center lane. The calculation may be performed by allowing the vehicle to drive on straight and/or curved portions of road for sufficient time (e.g., 20 seconds) and calculate the mean value of offset D over the past 10 seconds. This represents a steady-state value or "mean offset."

The mean value and standard deviation of offset D is used as a Key Performance Index, KPI, in the analysis. Also, the mean and standard deviation of Offset D is calculated separately for straight and curved road portions. For example, a deviation up to 0.2 m on a curved road at posted speed limits may be considered a pass while a target mean offset of 0.1 m on a straight road may serve as a passing condition. FIG. 12 includes a table containing KPI's calculated during a simulation.

Figure 17A:
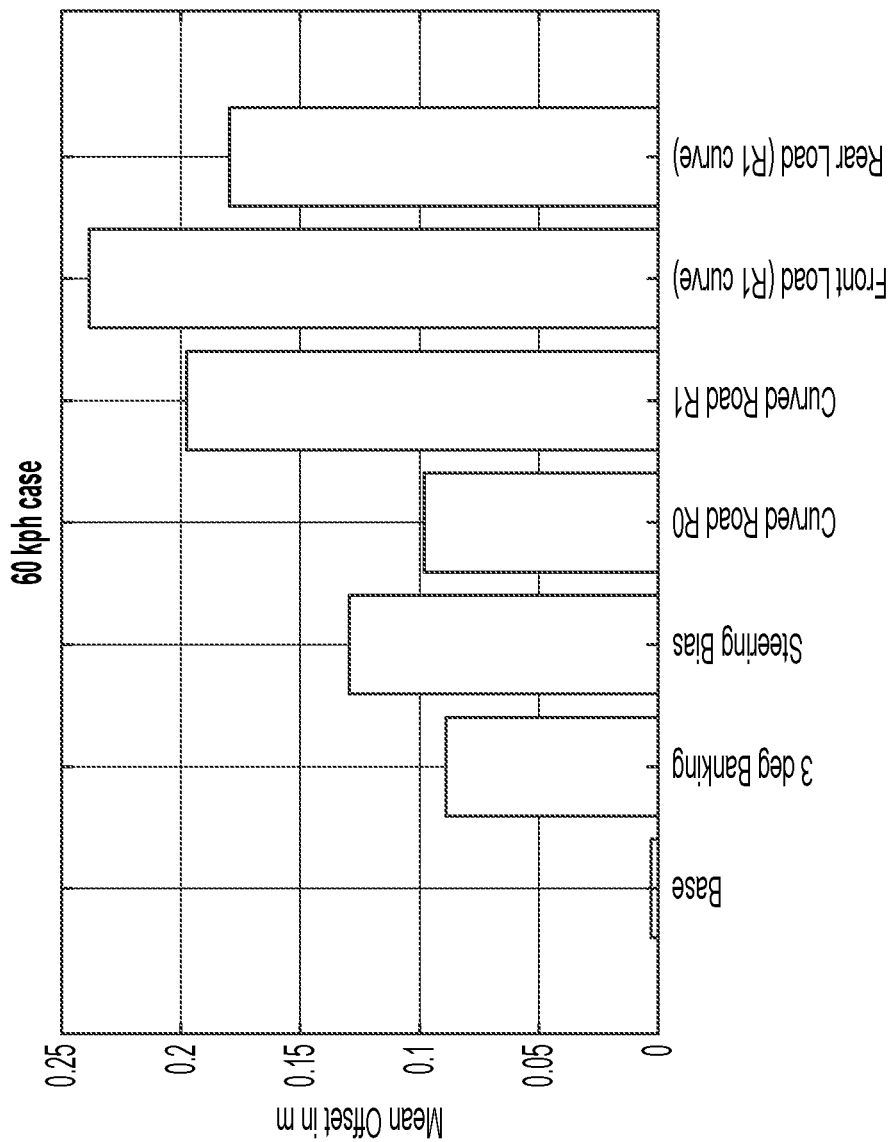
FIGS. 17A and 17B are graphs of effects of various variations at different speeds.
Figure 17B:
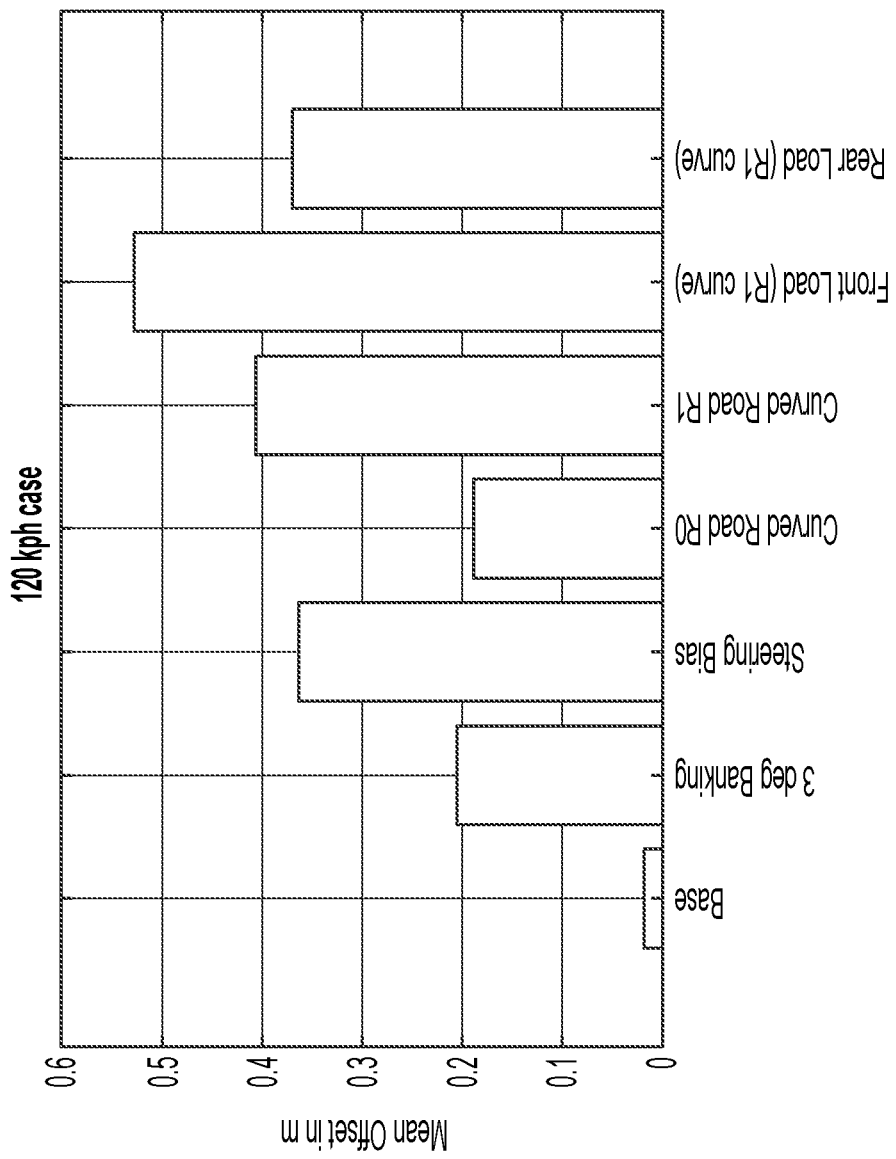

However, to check the control algorithm's performance for robustness and the effect of various factors, common variations such as vehicle parameters (e.g., mass and wheelbase) must be considered (FIG. 11B). External factors such as road banking must also be considered to evaluate the performance of the lane centering feature. To evaluate this, tables in FIGS. 13-15 include variations in simulations in addition to the same base case (FIG. 12). In the table of FIG. 13, the host vehicle mass and wheelbase increased by ten percent and the table includes the subsequent KPIs calculated. In the table of FIG. 14, the host vehicle mass and wheelbase are decreased by ten percent and the table includes the subsequent KPIs calculated. In the table of FIG. 15, the road banking is changed from 0 to −3 degrees and the table includes the subsequent KPIs calculated. FIG. 17A illustrates the effect of various variation factors on mean offset at 60 kph while FIG. 17B illustrates the effect of various variation factors on mean offset at 120 kph. As shown, variations may significantly change performance compared to the base case.

Figure 18:
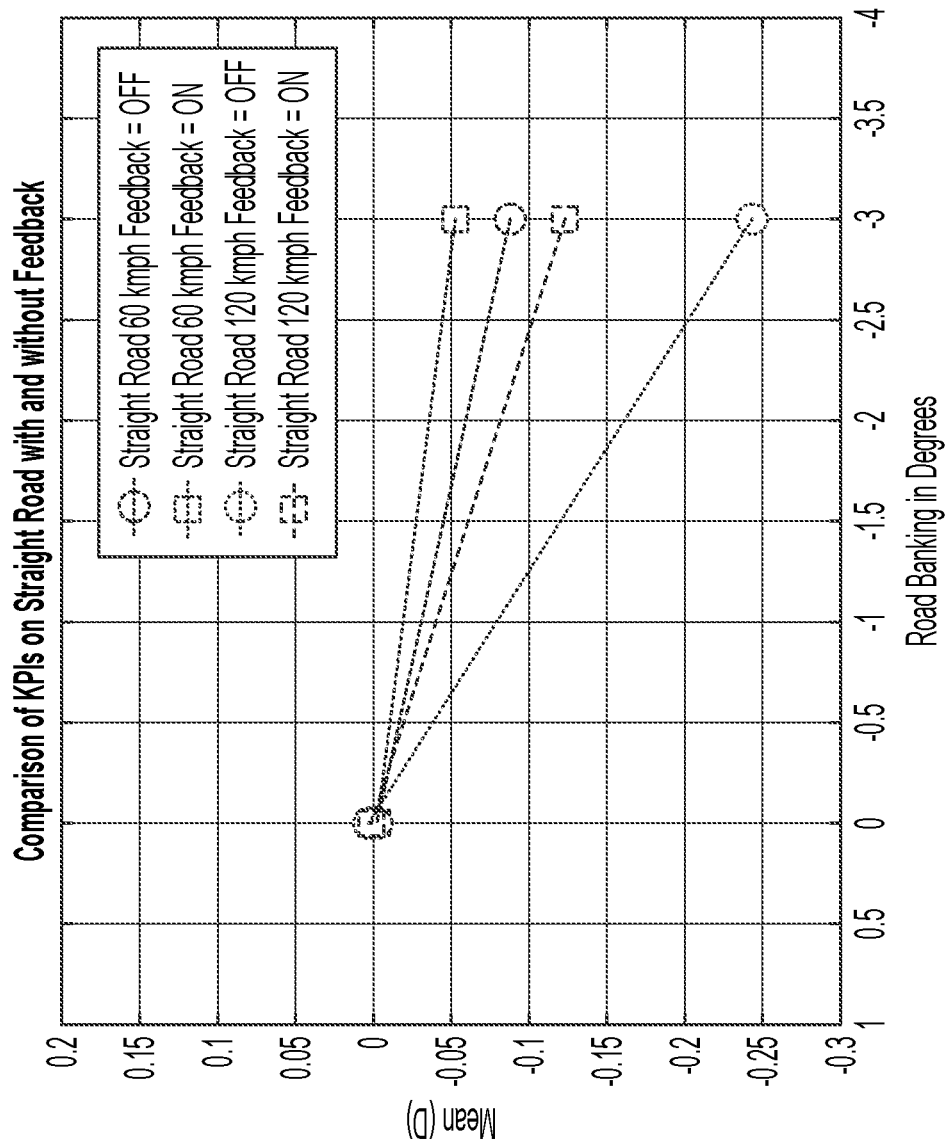
FIGS. 18 and 19 are plots of comparisons of key performance indexes with various road conditions.
Figure 19:
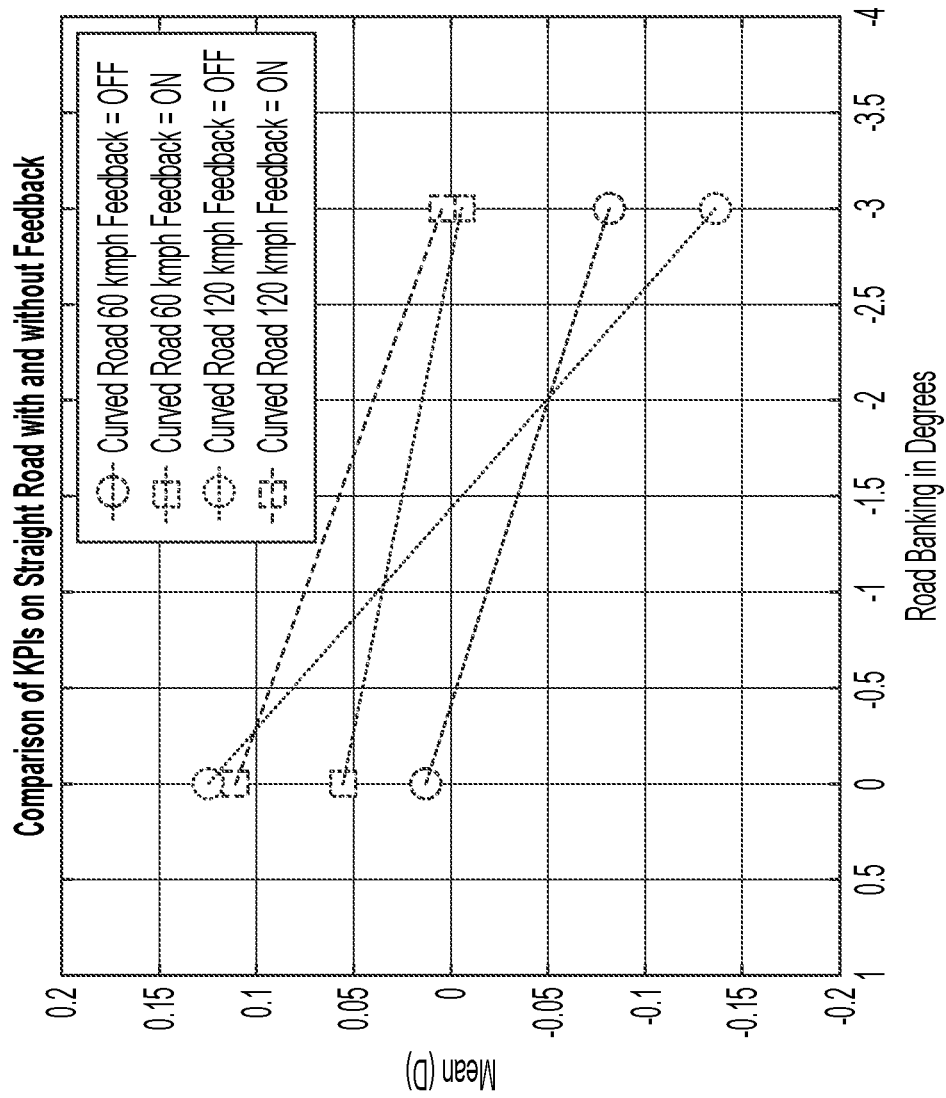

The KPIs calculated from the base case provide promising results with iterative planning. But with the introduction of different variations such as host vehicle mass, wheelbase and road banking, the KPIs deteriorated. That is, the effect of variations leads to a higher mean offset. To minimize this effect on D due to such variations and to increase robustness, the algorithm may be modified to produce more beneficial effects. For example, the algorithm includes added feedback terms (e.g., a PID term(s)) in the curvature control module which helps in improving the overall KPIs. FIG. 16 includes a table where the KPIs are recalculated using the feedback. FIGS. 18 and 19 include plots that compare the KPIs on a straight road with and without feedback (FIG. 18) and compare the KPIs on curved roads with and without feedback (FIG. 19).

The integrator term may mainly contribute to reduce the error due to the external variation, as shown in Equation (4):

$$\delta_d = (L + K_{us} \cdot U^2) k_d + (K_P \cdot e_k + K_D \dot{e}_k + K_I \int e_k) \tag{14}$$

where, $e_k = K_d - K$.

Figure 20A:
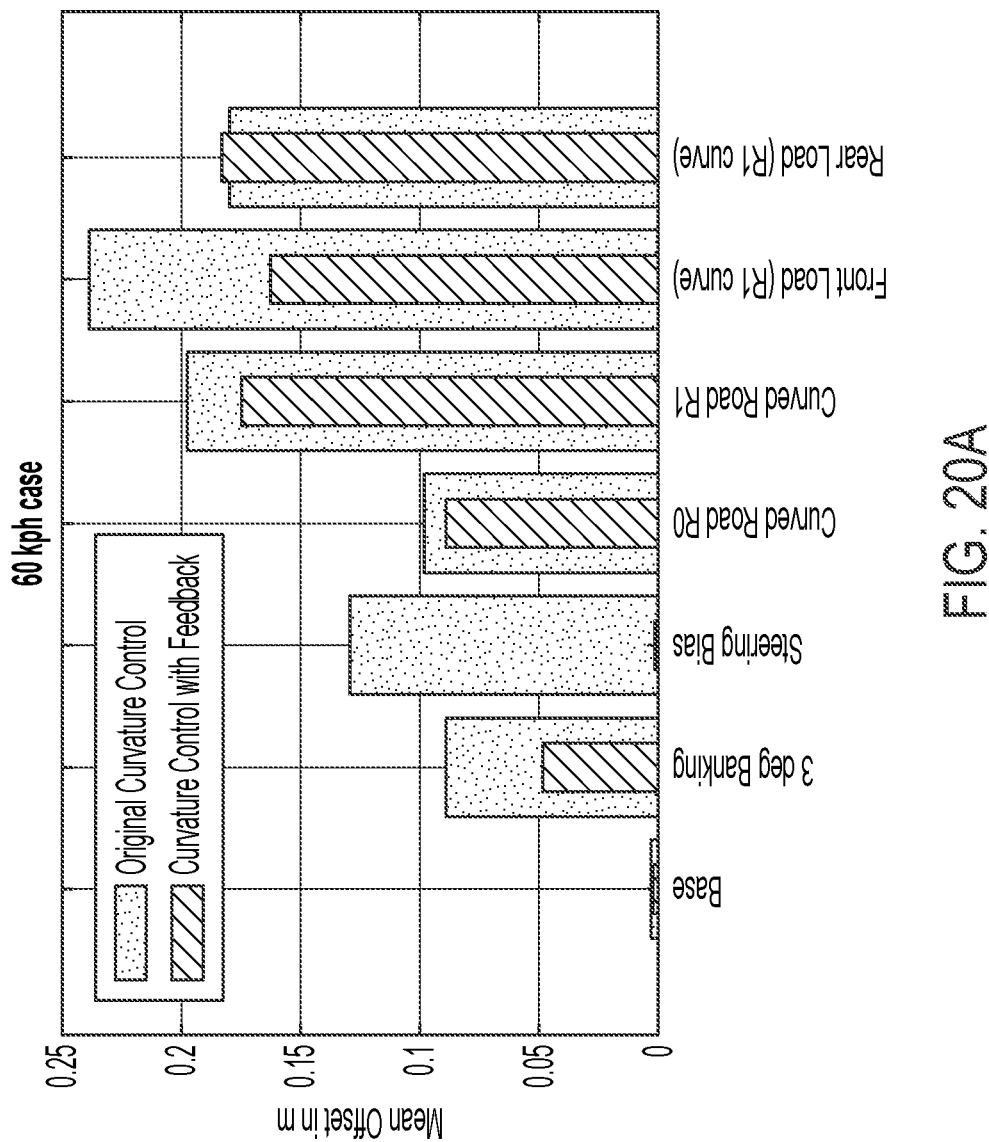
FIGS. 20A and 20B are graphs of effects of various variations at different speeds with effects of the variations minimized.
Figure 20B:
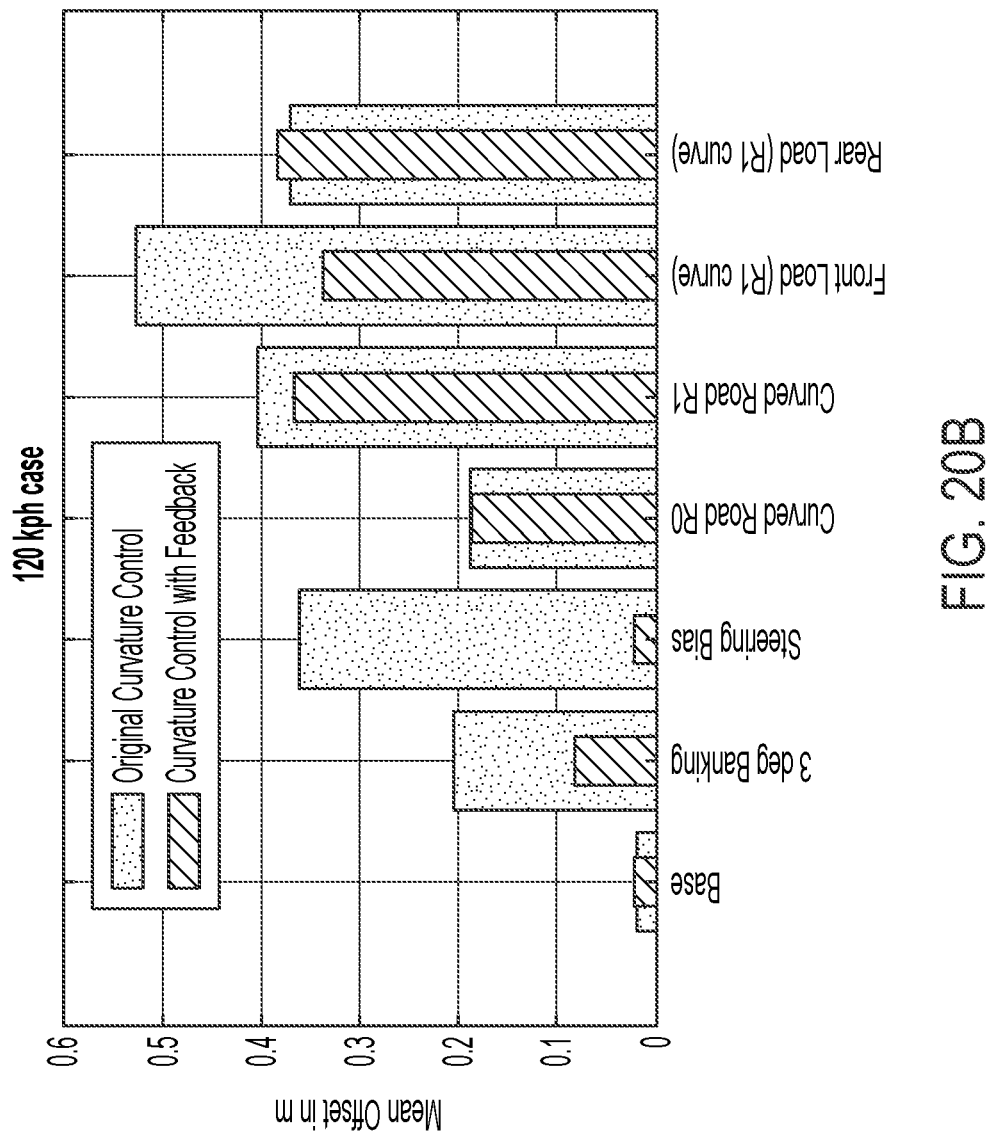

FIG. 20A illustrates an effect of various variation factors on mean offset at 60 kph when minimized with modifications to the curvature control. Likewise, FIG. 20B illustrates an effect of various factors on mean offset at 120 kph when minimized with modifications to the curvature control.

Therefore, the techniques herein include a trajectory planning approach to implement a lane-centering feature. Here, it is shown that the results of algorithm performance are generally acceptable for the flat road cases. However, with variation introduced in road geometry or vehicle parameters, the offset value changes significantly. These variations result in change of understeer coefficients and tire dynamics. In some cases, a significant non-zero steer angle is required for driving on a straight road. However, addition of appropriate curvature feedback can reduce such variations. This is just one of the ways to increase robustness of this algorithm to variations. Other methods, such as predicting banking angle or steering angle bias or tire stiffness changes, etc., may also increase robustness and/or performance. Descriptions herein include the common variation factors to be considered when designing a lateral control algorithm. Thus, the simulation tools as described herein may help in evaluating practical variation factors early in the development phase of a feature.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a vehicular lane centering algorithm, the method comprising:
    providing a simulation environment, wherein the simulation environment simulates a vehicle;
    providing the vehicular lane centering algorithm to the simulation environment;
    generating a base scenario for the vehicular lane centering algorithm for use by the simulated vehicle;
    receiving, from the simulation environment, traffic lane information, wherein the traffic lane information comprises (i) a first plurality of points from a left lane marker of a simulated traffic lane and (ii) a second plurality of points from a right lane marker of the simulated traffic lane;
    fitting a first polynomial to the first plurality of points;
    fitting a second polynomial to the second plurality of points;
    measuring performance of the vehicular lane centering algorithm during the base scenario using the first polynomial and the second polynomial;
    generating a plurality of modified scenarios derived from the base scenario, wherein each modified scenario of the plurality of modified scenarios adjusts at least one parameter of the base scenario, and wherein the at least one parameter comprises at least one selected from the group consisting of (i) vehicle mass and (ii) vehicle wheelbase; and
    measuring performance of the vehicular lane centering algorithm during the plurality of modified scenarios using the first polynomial and the second polynomial.

2. The method of claim 1, comprising generating an output based on the performance of the vehicular lane centering algorithm during the base scenario and each modified scenario of the plurality of modified scenarios.

3. The method of claim 1, wherein the at least one parameter comprises at least one selected from the group consisting of (i) at least one vehicle parameter, and (ii) at least one environmental parameter.

4. The method of claim 1, wherein the at least one parameter comprises road banking.

5. The method of claim 1, wherein measuring the performance of the vehicular lane centering algorithm comprises determining a key performance index.

6. The method of claim 5, wherein the key performance index is based on an offset of the simulated vehicle from a center of a current traffic lane the simulated vehicle is travelling along in the simulation environment.

7. The method of claim 1, wherein measuring the performance of the vehicular lane centering algorithm comprises simulating the vehicular lane centering algorithm on straight road portions and curved road portions.

8. The method of claim 1, wherein measuring the performance of the vehicular lane centering algorithm comprises simulating the vehicular lane centering algorithm at a plurality of different speeds.

9. The method of claim 1, wherein measuring the performance of the vehicular lane centering algorithm during each of the plurality of modified scenarios comprises providing feedback to the vehicular lane centering algorithm during simulation.

10. The method of claim 9, wherein the feedback is based on a current position of the simulated vehicle within a current traffic lane the simulated vehicle is travelling along in the simulation environment.

11. A method for testing a vehicular lane centering algorithm, the method comprising:
    providing a simulation environment, wherein the simulation environment simulates a vehicle;
    providing the vehicular lane centering algorithm to the simulation environment;
    generating a base scenario for the vehicular lane centering algorithm for use by the simulated vehicle;
    receiving, from the simulation environment, traffic lane information, wherein the traffic lane information comprises (i) a first plurality of points from a left lane marker of a simulated traffic lane and (ii) a second plurality of points from a right lane marker of the simulated traffic lane;
    fitting a first polynomial to the first plurality of points;
    fitting a second polynomial to the second plurality of points;
    measuring performance of the vehicular lane centering algorithm during the base scenario using the first polynomial and the second polynomial;
    generating a plurality of modified scenarios derived from the base scenario, wherein each modified scenario of the plurality of modified scenarios adjusts at least one parameter of the base scenario, and wherein the at least one parameter comprises at least one selected from the group consisting of (i) vehicle mass and (ii) vehicle wheelbase;
    measuring performance of the vehicular lane centering algorithm during the plurality of modified scenarios using the first polynomial and the second polynomial;
    generating an output based on the performance of the vehicular lane centering algorithm during the base scenario and each modified scenario of the plurality of modified scenarios; and
    updating the vehicular lane centering algorithm based on the generated output.

12. The method of claim 11, wherein the at least one parameter comprises at least one selected from the group consisting of (i) at least one vehicle parameter, and (ii) at least one environmental parameter.

13. The method of claim 11, wherein the at least one parameter comprises road banking.

14. The method of claim 11, wherein measuring the performance of the vehicular lane centering algorithm comprises simulating the vehicular lane centering algorithm on straight road portions and curved road portions.

15. A method for testing a vehicular lane centering algorithm, the method comprising:
    providing a simulation environment, wherein the simulation environment simulates a vehicle;
    providing the vehicular lane centering algorithm to the simulation environment;
    generating a base scenario for the vehicular lane centering algorithm for use by the simulated vehicle;
    receiving, from the simulation environment, traffic lane information, wherein the traffic lane information comprises (i) a first plurality of points from a left lane marker of a simulated traffic lane and (ii) a second plurality of points from a right lane marker of the simulated traffic lane;
    fitting a first polynomial to the first plurality of points;
    fitting a second polynomial to the second plurality of points;

measuring performance of the vehicular lane centering algorithm during the base scenario using the first polynomial and the second polynomial, wherein measuring the performance of the vehicular lane centering algorithm comprises determining a plurality of key performance indexes for at least one straight road portion the simulated vehicle travels along and at least one curved road portion the simulated vehicle travels along;

generating a plurality of modified scenarios derived from the base scenario, wherein each modified scenario of the plurality of modified scenarios adjusts at least one parameter of the base scenario, and wherein the at least one parameter comprises at least one selected from the group consisting of (i) vehicle mass and (ii) vehicle wheelbase; and measuring performance of the vehicular lane centering algorithm during the plurality of modified scenarios using the first polynomial and the second polynomial.

16. The method of claim 15, wherein at least one key performance index of the plurality of key performance indexes is based on an offset of the simulated vehicle from a center of a current traffic lane the simulated vehicle is travelling along in the simulation environment.

17. The method of claim 15, wherein measuring the performance of the vehicular lane centering algorithm comprises simulating the vehicular lane centering algorithm at a plurality of different speeds.

18. The method of claim 15, wherein measuring the performance of the vehicular lane centering algorithm during each of the plurality of modified scenarios comprises providing feedback to the vehicular lane centering algorithm during simulation.

\* \* \* \* \*